US012811809B2

(12) United States Patent
Paik et al.

(10) Patent No.: US 12,811,809 B2
(45) Date of Patent: Nov. 24, 2026

(54) INTERMEDIATE SERVER INTERMEDIATING FEDERATED LEARNING, USER DEVICE, AND SYSTEM INCLUDING INTERMEDIATE SERVER AND USER DEVICE

(71) Applicant: SAMSUNG ELECTRONICS CO., LTD., Suwon-si (KR)

(72) Inventors: Jungha Paik, Suwon-si (KR); Dongmin Kim, Suwon-si (KR); Bumhan Kim, Suwon-si (KR); Hyeongseok Kim, Suwon-si (KR); Dongwook Shim, Suwon-si (KR); Dasom Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 35 days.

(21) Appl. No.: 18/990,175

(22) Filed: Dec. 20, 2024

(65) Prior Publication Data

US 2025/0132929 A1 Apr. 24, 2025

Related U.S. Application Data

(63) Continuation of application No. PCT/KR2024/014881, filed on Sep. 30, 2024.

(30) Foreign Application Priority Data

Oct. 16, 2023 (KR) ........................ 10-2023-0138030
Dec. 1, 2023 (KR) ........................ 10-2023-0172481

(51) Int. Cl.

| | |
|---|---|
| ***H04L 9/32*** | (2006.01) |
| ***G06N 3/098*** | (2023.01) |
| ***H04L 9/14*** | (2006.01) |

(52) U.S. Cl.
CPC ........... *H04L 9/3263* (2013.01); *G06N 3/098* (2023.01); *H04L 9/14* (2013.01)

(58) Field of Classification Search
CPC .......... G06F 21/41; G06F 21/31; G06F 21/32; G06F 21/335; G06F 2221/2115;
(Continued)

(56) References Cited

U.S. PATENT DOCUMENTS 9,729,414 B1 * 8/2017 Oliveira ................ H04L 41/042
9,749,888 B1 * 8/2017 Colwell .................. H04L 43/16
(Continued)

FOREIGN PATENT DOCUMENTS

EP 4083868 A1 11/2022
KR 20220106619 A 7/2022
(Continued)

OTHER PUBLICATIONS

International Search Report and Written Opinion corresponding to Application No. PCT/KR2024/014881; Dated Dec. 24, 2024.

*Primary Examiner* — Sharif E Ullah
(74) *Attorney, Agent, or Firm* — CANTOR COLBURN LLP

(57) ABSTRACT

A server intermediating federated learning, a user device, and a system including the server and the user device are disclosed. An intermediate server receives a global model from a central server to transmit the global model to a plurality of user devices. The intermediate server updates the global model based on a plurality of local models received respectively from the plurality of user devices in response to the transmission of the global model. One or more of the plurality of user devices includes a machine learning core to generate a local model by training the global model. The global model and individual data of a user device input into the machine learning core are encrypted or decrypted based
(Continued)

on whether a key manager is comprised in the machine learning core.

17 Claims, 9 Drawing Sheets

(58) Field of Classification Search
CPC ............... G06F 16/256; H04L 63/0815; H04L 63/0807; H04L 63/101; H04L 67/20; H04L 69/329; H04L 29/12122; H04L 61/1547; H04L 63/102; H04L 63/105; H04L 9/3263; G06Q 50/01; G06Q 10/10; G06Q 20/223; G06Q 20/32; G06Q 20/322; G06Q 20/389; G06Q 20/40; G06Q 20/4014
USPC ........ 713/171, 150, 163, 181; 726/2, 21, 36; 380/255, 264, 276
See application file for complete search history.

(56) References Cited

U.S. PATENT DOCUMENTS 9,798,883 B1* 10/2017 Gil .................... H04L 63/1433
9,817,699 B2* 11/2017 Stich .................... G06F 9/5083
9,830,192 B1* 11/2017 Crouchman ....... G06Q 30/0601
9,882,830 B2* 1/2018 Taylor .................. H04L 47/783
9,935,829 B1* 4/2018 Miller .................. G06F 15/177
9,959,188 B1* 5/2018 Krishnan ............ G06F 9/45533
9,967,275 B1* 5/2018 Kolman ............... H04L 63/1425
9,979,617 B1* 5/2018 Meyer ................ H04L 41/0897
10,003,550 B1* 6/2018 Babcock ................ H04L 47/83
10,015,094 B1* 7/2018 Akers .................. H04L 45/745
10,148,631 B1* 12/2018 Sokolov ............... H04W 12/65
10,212,041 B1* 2/2019 Rastogi ............... H04L 41/0894
10,237,135 B1* 3/2019 Alabsi ................ H04L 41/0895
10,313,211 B1* 6/2019 Rastogi ............... H04L 41/0631
10,372,600 B2* 8/2019 Mathur .................. G06F 11/32
10,547,521 B1* 1/2020 Roy .................... H04L 41/0895
10,594,562 B1* 3/2020 Rastogi ............... G06F 9/45558
10,630,543 B1* 4/2020 Wei ...................... H04L 41/046
10,657,461 B2* 5/2020 McMahan ............... G06F 17/16
10,728,121 B1* 7/2020 Chitalia .............. G06F 3/04817
10,873,541 B2* 12/2020 Alvarez Callau ..... G06F 9/5061
10,931,548 B1* 2/2021 Lyer .................... H04L 67/1097
10,999,168 B1* 5/2021 Gupta .................. H04L 43/045
11,283,697 B1* 3/2022 Rajagopalan ....... G06F 16/2477
11,411,825 B2* 8/2022 Rastogi ............... G06F 9/45558
11,443,240 B2* 9/2022 Peterson .................. G06N 3/04
11,475,350 B2* 10/2022 McMahan .............. G06N 20/00
11,513,844 B1* 11/2022 Aleti ...................... G06F 9/4843
11,582,120 B2* 2/2023 Basavaiah ........... H04L 61/4511
11,736,372 B2* 8/2023 Rastogi ............... G06F 11/3452
709/224
2006/0123472 A1* 6/2006 Schmidt .............. H04L 63/0815
726/8
2007/0154016 A1* 7/2007 Nakhjiri ............ H04W 12/0431
380/270
2008/0010287 A1* 1/2008 Hinton .................... H04L 61/30
2008/0010288 A1* 1/2008 Hinton ................ H04L 63/0815
2008/0021866 A1* 1/2008 Hinton .................... G06Q 10/10
2010/0208742 A1* 8/2010 Kafle ...................... H04L 45/00
370/401
2013/0151853 A1* 6/2013 Azzouz ................. H04L 9/0863
713/171
2013/0326623 A1* 12/2013 Kruglick .................. G06N 7/01
726/23
2015/0135277 A1* 5/2015 Vij ...................... H04L 63/0892
726/4
2016/0205106 A1* 7/2016 Yacoub ............... H04W 12/041
726/28
2017/0195090 A1* 7/2017 Boidol ..................... G06N 7/01
2017/0324555 A1* 11/2017 Wu ....................... H04L 9/0869
2017/0331907 A1* 11/2017 Jagannath ............... H04L 43/16
2017/0344618 A1* 11/2017 Horowitz ............ G06F 11/0709
2018/0004582 A1* 1/2018 Hallenstål ............ G06F 16/252
2018/0018244 A1* 1/2018 Yoshimura ............ G06F 9/5077
2018/0041408 A1* 2/2018 Dagum ................. H04L 43/045
2018/0041470 A1* 2/2018 Schultz ................... H04L 45/22
2018/0041487 A1* 2/2018 Wang .................. G06F 16/9535
2018/0046482 A1* 2/2018 Karve ................. G06F 9/45558
2018/0063193 A1* 3/2018 Chandrashekhar ... G06F 11/008
2018/0088935 A1* 3/2018 Church ................. G06F 11/302
2018/0089328 A1* 3/2018 Bath ....................... G06F 16/22
2018/0136931 A1* 5/2018 Hendrich ................ G06F 11/30
2018/0287902 A1* 10/2018 Chitalia .............. G06F 11/3433
2018/0309637 A1* 10/2018 Gill ....................... H04L 41/122
2018/0335946 A1* 11/2018 Wu .................. G06F 16/90339
2018/0367596 A1* 12/2018 Ananthapur Bache ......................
H04L 67/104
2019/0014102 A1* 1/2019 Mathew .................. G06F 21/41
2019/0121672 A1* 4/2019 Ding ..................... G06F 3/0484
2019/0158482 A1* 5/2019 Wang .................... H04W 12/33
2019/0199790 A1* 6/2019 Yang ................... H04L 67/1008
2019/0297014 A1* 9/2019 Azgin ..................... H04L 45/74
2020/0014594 A1* 1/2020 Lapiotis .............. H04L 41/0803
2020/0136942 A1* 4/2020 Rastogi ............... H04L 63/1425
2020/0142788 A1* 5/2020 Hu ........................ G06F 9/5077
2020/0169479 A1* 5/2020 Ireland ................ H04L 47/6215
2020/0374039 A1* 11/2020 Rau ....................... H04L 1/0061
2020/0382584 A1* 12/2020 Basavaiah ............... H04L 43/10
2021/0119923 A1* 4/2021 Brown .................... H04L 47/80
2021/0144141 A1* 5/2021 Lee ....................... H04L 9/0897
2021/0349749 A1* 11/2021 Guha .................. H04L 43/0882
2022/0141102 A1* 5/2022 Rastogi ............... H04L 43/0894
709/224
2022/0286373 A1* 9/2022 Rajagopalan ....... G06F 16/2477
2022/0353201 A1* 11/2022 Navali ................ H04L 41/5054
2022/0368758 A1* 11/2022 Suri .................... H04L 61/4511
2022/0374762 A1* 11/2022 Radhakrishnan ........ G06N 3/08
2022/0400098 A1* 12/2022 Rao ..................... H04L 67/1023
2023/0008976 A1* 1/2023 Xu ......................... G06N 20/00
2023/0018908 A1* 1/2023 Yue ..................... H04L 63/1425
2023/0024475 A1* 1/2023 Mandeyam ......... H04L 61/2503
2023/0025679 A1* 1/2023 Mandeyam ......... H04L 63/1466
2023/0052818 A1* 2/2023 Jain ......................... H04L 12/56
2023/0107510 A1* 4/2023 Chalk ................... G06F 21/602
713/193
2023/0153461 A1* 5/2023 Kalra .................. G06F 21/6245
726/27
2023/0177349 A1* 6/2023 Balakrishnan ......... G06N 3/084
706/25
2023/0267326 A1* 8/2023 Jiang ........................ G06N 3/10
706/25
2024/0086720 A1* 3/2024 Li .......................... G06N 3/084
2024/0235830 A1* 7/2024 Naqvi ..................... H04L 9/088

FOREIGN PATENT DOCUMENTS

KR 20230056499 A 4/2023
KR 20230064893 A 5/2023
KR 20230094929 A 6/2023
KR 20230096617 A 6/2023

* cited by examiner

INTERMEDIATE SERVER INTERMEDIATING FEDERATED LEARNING, USER DEVICE, AND SYSTEM INCLUDING INTERMEDIATE SERVER AND USER DEVICE

CROSS-REFERENCE TO RELATED APPLICATIONS

This application is a continuation application of International Application No. PCT/KR2024/014881 designating the United States, filed on Sep. 30, 2024, in the Korean Intellectual Property Receiving Office and claiming priority to Korean Patent Application No. 10-2023-0138030, filed on Oct. 16, 2023, in the Korean Intellectual Property Office, and to Korean Patent Application No. 10-2023-0172481, filed on Dec. 1, 2023, in the Korean Intellectual Property Office, the disclosures of all of which are incorporated by reference herein in their entireties.

BACKGROUND

1. Field

An intermediate server intermediating federated learning, a user device, and a system including the intermediate server and the user device are disclosed.

2. Description of Related Art

An intermediate server intermediating federated learning, a user device, and a system including the intermediate server and the user device are disclosed.

SUMMARY

According to an embodiment of the present disclosure, an intermediate server includes a memory, comprising one or more storage mediums, storing instructions and at least one processor comprising processing circuitry, wherein the instructions, when executed by the at least one processor individually and/or collectively, cause the intermediate server to receive a global model from a central server to transmit the global model to a plurality of user devices comprised in a system. The instructions, when executed by the at least one processor individually and/or collectively, further cause the intermediate server to update the global model based on a plurality of local models received respectively from the plurality of user devices in response to the transmission of the global model. The intermediate server may receive a first certificate including a first key pair for signing and a first key pair for encryption from a root server. The intermediate server may issue a certificate to the central server based on the first key pair for signing in response to a certificate issuance request from the central server.

According to an embodiment of the present disclosure, a user device includes a memory, comprising one or more storage mediums, storing instructions and at least one processor comprising processing circuitry, wherein the instructions, when executed by the at least one processor individually and/or collectively, cause the user device to receive a global model from an intermediate server. The instructions, when executed by the at least one processor individually and/or collectively, cause the user device to generate a local model by training the global model using individual data of the user device in a machine learning core. The instructions, when executed by the at least one processor individually and/or collectively, cause the user device to transmit the generated local model to the intermediate server. The global model and the individual data input into the machine learning core may be encrypted or decrypted based on whether a key manager is included in the machine learning core.

According to an embodiment of the present disclosure, a system includes an intermediate server configured to receive a global model from a central server to transmit the global model to a plurality of user devices included in the system. The system includes the intermediate server configured to update the global model based on a plurality of local models received respectively from the plurality of user devices in response to the transmission of the global model. The system includes a plurality of user devices configured to receive the global model. The system includes a plurality of user devices configured to generate a local model by training the global model. The system includes the plurality of user devices configured to transmit the generated local model to the intermediate server. One or more of the plurality of user devices may include a machine learning core configured to generate the local model by training the global model. The global model and the individual data input into the machine learning core may be encrypted or decrypted based on whether a key manager is included in the machine learning core.

According to an embodiment of the present disclosure, an operating method of an intermediate server includes receiving a global model from a central server to transmit the global model to a plurality of user devices. The operating method of the intermediate server includes updating the global model based on a plurality of local models received respectively from the plurality of user devices in response to the transmission of the global model. The operating method of the intermediate server includes receiving a first certificate including a first key pair for signing and a first key pair for encryption from a root server. The operating method of the intermediate server includes issuing a certificate to the central server based on the first key pair for signing in response to a certificate issuance request from the central server.

According to an embodiment of the present disclosure, a non-transitory storage medium may store a computer program that may execute the operating method of the system described above.

According to an embodiment of the present disclosure, an operating method of a user device includes receiving a global model from an intermediate server. According to an embodiment of the present disclosure, the user device includes generating a local model by training the global model in a machine learning core using individual data of the user device. According to an embodiment of the present disclosure, the user device includes transmitting the generated local model to the intermediate server. The global model and the individual data input into the machine learning core may be encrypted or decrypted based on whether a key manager is included in the machine learning core.

According to an embodiment of the present disclosure, a non-transitory computer-readable storage medium may store a computer program that may execute the operating method of the user device described above.

According to an embodiment of the present disclosure, an operating method of a system includes an operation in which an intermediate server receives a global model from a central server and transmits the global model to a plurality of user devices included in the system. The operating method of the system includes an operation in which the plurality of user devices receives the global model and generates a local model by training the global model using individual data. The operating method of the system includes an operation in which the plurality of user devices transmits the generated local model to the intermediate server. The operating method of the system includes an operation in which the intermediate server updates the global model based on a plurality of local models received respectively from the plurality of user devices. One or more of the plurality of user devices may include a machine learning core configured to generate the local model by training the global model. The global model and the individual data input into the machine learning core may be encrypted or decrypted based on whether a key manager is included in the machine learning core.

According to an embodiment of the present disclosure, a non-transitory storage medium may store a computer program that may execute the operating method of the system described above.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
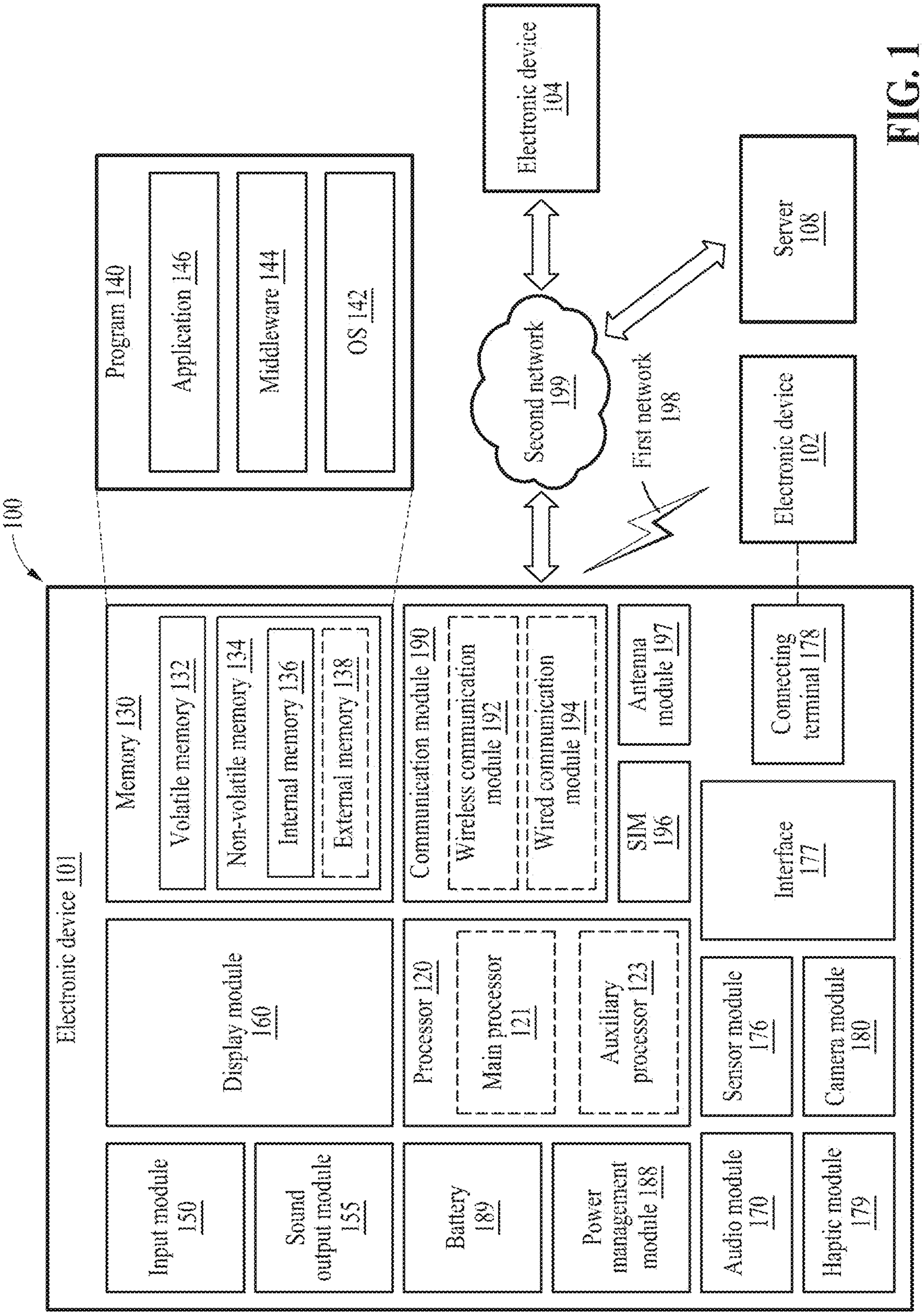
FIG. 1 is a block diagram illustrating an electronic device in a network environment, according to various embodiments.

Hereinafter, embodiments will be described in detail with reference to the accompanying drawings. When describing the embodiments with reference to the accompanying drawings, like reference numerals refer to like elements and any repeated description related thereto will be omitted.

FIG. 1 is a block diagram illustrating an electronic device 101 in a network environment 100, according to various embodiments. Referring to FIG. 1, the electronic device 101 in the network environment 100 may communicate with an electronic device 102 via a first network 198 (e.g., a short-range wireless communication network) or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added to the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an assistance processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the assistance processor 123, the assistance processor 123 may be adapted to consume less power than the main processor 121 or to be specific to a specified function. The auxiliary processor 123 may be implemented separately from the main processor 121 or as a portion of the main processor 121.

The assistance processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence model processing. An artificial intelligence (AI) model may be generated through machine learning. Such learning may be performed by, for example, the electronic device 101, in which an AI model is executed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive, from the outside (e.g., a user) of the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an embodiment, the display module 160 may include a touch sensor adapted to sense a touch, or a pressure sensor adapted to measure the intensity of force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., the electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., an mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197.

According to various embodiments, the antenna module 197 may form a mmWave antenna module. According to an embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed at the electronic device 101 may be executed at one or more external electronic devices (e.g., the external devices 102 and 104, or the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer a result of the performance to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or MEC. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the present disclosure, the electronic device is not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," may include any one of the items listed together in the corresponding one of the phrases, or all possible combinations thereof. Terms such as "1st" and "2nd," or "first" and "second" may be used to simply distinguish a corresponding component from other components, and do not limit the components in other aspects (e.g., importance or order). It is to be understood that if a component (e.g., a first component) is referred to, with or without the term "operatively" or "communicatively," as "coupled with," "coupled to," "connected with," or "connected to" another component (e.g., a second component), the component may be coupled with the other component directly (e.g., by wire), wirelessly, or via a third component.

As used in connection with various embodiments of the present disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the present disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
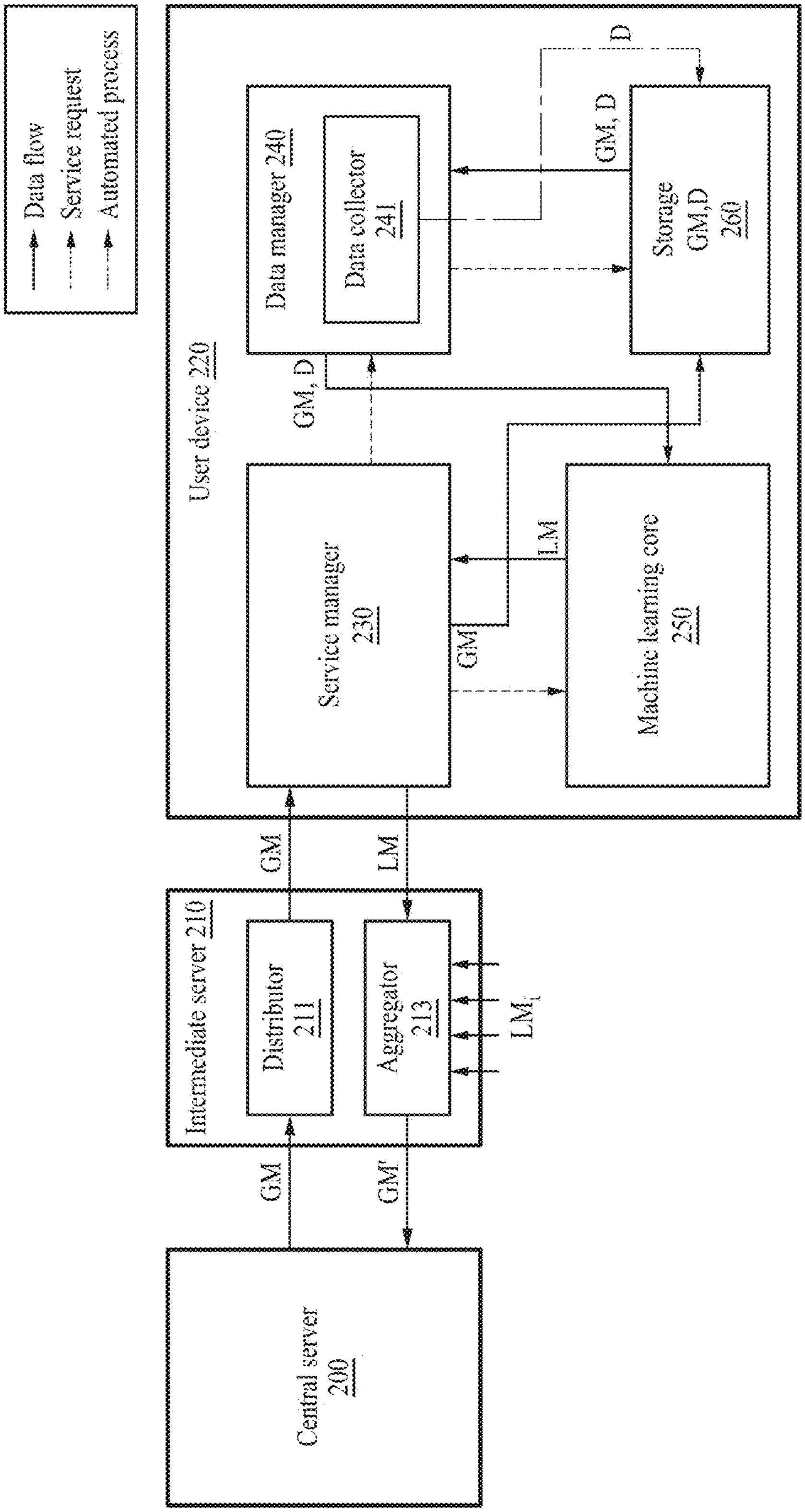
FIG. 2 is a diagram illustrating a system configuration according to various embodiments.

FIG. 2 is a diagram illustrating a system configuration according to various embodiments.

FIG. 2 illustrates a central server 200, an intermediate server 210 (e.g., the server 108 of FIG. 1), and a user device 220 (e.g., the electronic device 101 of FIG. 1) that perform federated learning. In the present disclosure, for ease of description, description is provided based on a single user device 220. However, it is obvious to those skilled in the art that a plurality of user devices participates in federated learning and that the description of the user device 220 may be applied to the plurality of user devices.

The central server 200 may be a server of a participant who designs a machine learning model. The central server 200 may be a server of a participant who owns a machine learning model (e.g., a global model of FIG. 2). In other words, the central server 200 may be a server of a model owner. The model owner may be a participant who originally designs and owns a machine learning model. The model owner may include an entity that performs federated learning by distributing, to a user device, a global model (hereinafter, "GM") owned by the model owner. The central server 200 may be a server of an agent who desires to perform federated learning by distributing GM. In other words, the central server 200 may be a server of an agent providing a service. However, according to various embodiments, the agent who desires to perform federated learning may be separated from the central server 200.

The intermediate server 210 may receive a GM from the central server 200. For example, the intermediate server 210 may be a proxy server. The intermediate server 210 may transmit the received GM to a plurality of user devices using a distributor 211. The intermediate server 210 may receive a plurality of local models (i.e., $LM_i$ of FIG. 2, wherein i denotes the number of user devices) from each of the plurality of user devices in response to the transmission of the GM. The intermediate server 210 may update the GM using the received plurality of local models. The intermediate server 210 may transmit the updated GM (hereinafter, "GM'") to the central server 200. Although not shown in FIG. 2, it is obvious to those skilled in the art that the intermediate server 210 may include a processor and that the operation of the intermediate server 210 described in the present disclosure may be performed by the processor.

According to an embodiment, the intermediate server 210 may include the distributor 211 and an aggregator 213. The distributor 211 may transmit the GM received from the central server 200 to the plurality of user devices. The aggregator 213 may receive a plurality of local models from the plurality of user devices. The aggregator 213 may generate a GM' by updating the GM using the plurality of local models.

According to an embodiment, the intermediate server 210 may verify whether there is a possibility of violating a user's privacy when the GM received from the central server 200 is transmitted to the user device 220. The intermediate server 210 may verify whether the GM threatens the security of the user device 220 when executed on the user device 220. In addition to the verification described above, the intermediate server 210 may verify whether the GM causes various issues in the user device 220. The intermediate server 210 may transmit the GM to the user device 220 after performing the verification described above.

According to an embodiment, the intermediate server 210 may be located between the central server 200 and the user device 220. Accordingly, the intermediate server 210 may prevent infringement on the user's privacy by minimizing the contact point between the central server 200 and the user device 220.

The user device 220 may be an agent that receives and trains the GM. The user device 220 may include a service manager 230, a data manager 240, a machine learning core 250, and a storage 260. Although not shown in FIG. 2, the user device 220 may include a processor, and an operation of the user device 220 described in the present disclosure may be performed by the processor.

The service manager 230 may communicate with the intermediate server 210. The service manager 230 may transmit a request for training the GM and the result (i.e., a local model (hereinafter, "LM")) of training the GM. The LM may be the result obtained by training the GM using individual data of the user device 220. The LM may exist in various forms depending on how federated learning is performed. The LM may include, in whole or in part, learned weights, biases, gradients, low-metrics, distilled networks, and the like. The service manager 230 may transmit the request for training the GM to the data manager 240 and the machine learning core 250.

According to an embodiment, the data manager 240 may collect data (i.e., D of FIG. 2) generated by the user device 220 through a data collector 241. Data (hereinafter, "D") may be individual D that is differentiated from another user device. The data manager 240 may store the collected D in the storage 260. When receiving the training request, the data manager 240 may request a GM and D from the storage 260 and transmit, to the machine learning core 250, the received GM and D in response to the training request.

According to an embodiment, the machine learning core 250 (e.g., a confidential machine learning computing core (CMLCC)) may receive the GM and the D from the data manager 240. The machine learning core 250 may provide various functions required for federated learning within the user device 220. For example, an environment for training a machine learning model may be provided. When receiving the training request, the GM, and the D, the machine learning core 250 may generate an LM by training the GM. The machine learning core 250 may be implemented in hardware and/or software.

According to an embodiment, the machine learning core 250 may be implemented in various ways to perform training while safely managing the GM in the user device 220. The machine learning core 250 may provide a space for training a machine learning model, wherein the space is separated from other components. The machine learning core 250 may provide the separate space for training the machine learning model, thereby preventing GM leakage and/or infringement during federated learning.

According to an embodiment, the machine learning core 250 may provide the user device 220 with a confidential computing environment for safe transmission and management of a machine learning model (i.e., GM). Therefore, the machine learning core 250 may prevent the risk of leakage and infringement of a machine learning model during federated learning. According to an embodiment, the machine learning core 250 may be separated from a general-purpose processor in hardware or software. For example, the machine learning core 250 may be implemented in hardware, such as a secure element and a secure processor. For example, the machine learning core 250 may be implemented separately from a general computing environment in software, such as a trusted execution environment (TEE) and a hypervisor.

The method of implementing the machine learning core 250 may vary depending on the location of a key manager. In other words, the machine learning core 250 may be implemented differently depending on whether the key manager exists inside or outside the machine learning core 250. This is further described with reference to FIGS. 5 to 8.

Hereinafter, the process of issuing a key and a certificate in advance to securely transmit data (i.e., GM, LM, GM', and D) is described.

Figure 3:
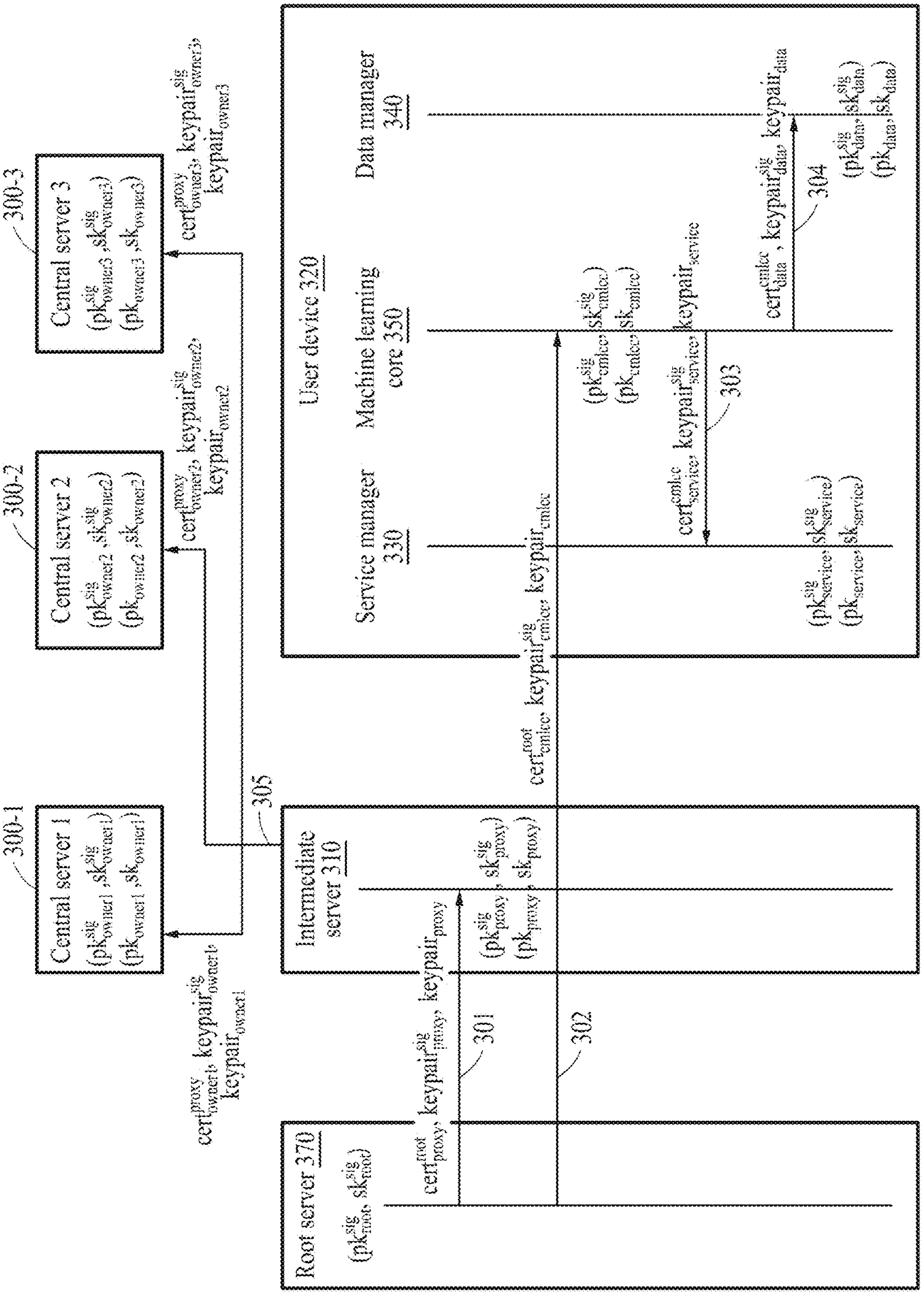
FIG. 3 is a diagram illustrating the issuance of key pairs, according to various embodiments.

FIG. 3 is a diagram illustrating the issuance of key pairs, according to various embodiments.

FIG. 3 illustrates a root server 370. According to an embodiment, the root server 370 may issue a key and a certificate of a public key cryptographic system used in a federated learning system. Therefore, the validity of all public keys used in the federated learning system may be verified based on the public key of the root server 370. Verification based on the public key of the root server 370 may be performed by various schemes.

According to an embodiment, hereinafter, ($pk_A$, $sk_A$) may be a pair of a public key ($pk_A$) and a private key ($sk_A$) of an entity A used in various public key cryptosystems such as a Rivest-Shamir-Adleman encryption scheme (RSAES). ($pk_A$, $sk_A$) may be simply represented as $keypair_A$. In addition, hereinafter, $$(pk_A^{sig}, sk_A^{sig})$$

may be a pair of a public key $$(pk_A^{sig})$$

and a private key $$(sk_A^{sig})$$

of the entity A used for various types of electronic signatures such as a Rivest-Shamir-Adleman probabilistic signature scheme (RSA-PSS).

$$(pk_A^{sig}, sk_A^{sig})$$

may be simply represented as $$keypair_A^{sig}.$$

Hereinafter, $$cert_A^B$$

may be a certificate for the entity A issued by an entity B.

In operation 301, when receiving a certificate issuance request from an intermediate server 310 (e.g., the server 108 of FIG. 1 and the intermediate server 210 of FIG. 2), the root server 370 may issue a certificate $$cert_{proxy}^{root}$$

to the intermediate server 310 using a key pair for signing $$(pk_{root}^{sig}, sk_{root}^{sig}).$$

According to an embodiment, the root server 370 may be a root certificate authority (CA) server. The certificate $$cert_{proxy}^{root}$$

may include a key pair for signing $$(pk_{proxy}^{sig}, sk_{proxy}^{sig})$$

and a key pair for encryption ($pk_{proxy}$, $sk_{proxy}$) of the intermediate server 310.

According to an embodiment, the key pair for signing $$(pk_{proxy}^{sig}, sk_{proxy}^{sig})$$

of the intermediate server 310 may be used for mutual authentication when an authenticated key is exchanged between the intermediate server 310 and the central server 300 (e.g., the central server 200 of FIG. 2). The key pair for signing $$(pk_{proxy}^{sig}, sk_{proxy}^{sig})$$

of the intermediate server 310 may be used for mutual authentication when an authenticated key is exchanged between the intermediate server 310 and a service manager 330 (e.g., the service manager 230 of FIG. 2) of a user device 320 (e.g., the electronic device 101 of FIG. 1 and the user device, 220 of FIG. 2). The key pair for signing $$(pk_{proxy}^{sig}, sk_{proxy}^{sig})$$

of the intermediate server 310 may be used to issue a certificate to the central server 300.

According to an embodiment, the key pair ($pk_{proxy}$, $sk_{proxy}$) of the intermediate server 310 may be used to protect a local model when the local model is transmitted from the user device 320. According to an embodiment, the encryption key pair ($pk_{proxy}$, $sk_{proxy}$) of the intermediate server 310 may be used to perform authenticated key exchange.

Operation 301 may be performed when the intermediate server 310 is installed independently of the user device 320. Alternatively, operation 301 may be performed when the intermediate server 310 obtains server authority from the root server 370. Operation 301 may be performed in various ways other than those described above.

According to an embodiment, a federated learning-related function may be implemented and included in the OS of the user device 320. Alternatively, the federated learning-related function may be included in advance in an application installed on the user device 320. Alternatively, the federated learning-related function may be configured to be downloaded through an application store and the like. When the federated learning-related function is implemented on the user device 320 due to one or more of various cases other than the cases described above, the procedure for obtaining consent to participate in federated learning may be performed automatically or through the user's execution of a function. When consent to participate in federated learning is granted, the issuance of a key pair for each entity may be proceed sequentially in response to requests from the entities included in the user device 320. Hereinafter, the issuance of key pairs for entities in the user device 320 is described.

In operation 302, when receiving a request for issuing a certificate from a machine learning core 350 (e.g., the machine learning core 250 of FIG. 2), the root server 370 may issue a certificate $$cert_{cmlcc}^{root}$$

to the machine learning core 350 using the key pair for signing $$(pk_{root}^{sig}, sk_{root}^{sig}).$$

The certificate $$cert_{cmlcc}^{root}$$

may include a key pair for signing $$(pk_{cmlcc}^{sig}, sk_{cmlcc}^{sig})$$

and a key pair for encryption ($pk_{cmlcc}$, $sk_{cmlcc}$).

The signature key pair $$(pk_{cmlcc}^{sig}, sk_{cmlcc}^{sig})$$

of the machine learning core 350 may be used for mutual authentication when authenticated key exchange is performed between the machine learning core 350 and a data manager 340 (e.g., the data manager 240 of FIG. 2). The key pair for signing $$(pk_{cmlcc}^{sig}, sk_{cmlcc}^{sig})$$

of the machine learning core 350 may be used for issuing a certificate to the service manager 330 and the data manager 340. The key pair for encryption ($pk_{cmlcc}$, $sk_{cmlcc}$) of the machine learning core 350 may be used to encrypt a global model (hereinafter, "GM") when the central server 300 transmits the GM to the user device 320. The key pair for encryption ($pk_{cmlcc}$, $sk_{cmlcc}$) of the machine learning core 350 may be used to encrypt individual data of a user when the individual data is stored in a storage (e.g., the storage 260 of FIG. 2) of the user device 320. According to an embodiment, the key pair for encryption ($pk_{cmlcc}$, $sk_{cmlcc}$) of the machine learning core 350 may be used as a part of an authenticated key exchange protocol when a key transport scheme is used during authenticated key exchange.

In operation 303, the machine learning core 350 may issue a certificate $$cert_{service}^{cmlcc}$$

when the service manager 330 transmits a request for issuing a certificate. The machine learning core 350 may issue the certificate $$cert_{service}^{cmlcc}$$

based on the key pair for signing $$(pk_{cmlcc}^{sig}, sk_{cmlcc}^{sig})$$

issued by the root server 370. The certificate $$cert_{service}^{cmlcc}$$

may include a key pair for signing $$(pk_{service}^{sig}, sk_{service}^{sig})$$

and a key pair for encryption ($pk_{service}$, $sk_{service}$) of the service manager 330.

The key pair for signing $$(pk_{service}^{sig}, sk_{service}^{sig})$$

of the service manager 330 may be used for mutual authentication when an authenticated key is exchanged between the service manager 330 and the intermediate server 310. The key pair for encryption ($pk_{service}$, $sk_{service}$) of the service manager 330 may be used when the key transport scheme is used for performing key exchange.

In operation 304, when receiving a request for issuing a certificate from the data manager 340, the machine learning core 350 may issue a certificate $$cert_{data}^{cmlcc}.$$

The machine learning core 350 may issue the certificate $$cert_{data}^{cmlcc}$$

based on the key pair for signing $$(pk_{cmlcc}^{sig}, sk_{cmlcc}^{sig})$$

issued by the root server 370. The certificate $$cert_{data}^{cmlcc}$$

may include a key pair for signing $$(pk_{data}^{sig}, sk_{data}^{sig})$$

and a key pair for encryption ($pk_{data}$, $sk_{data}$) of the data manager 340.

The key pair for signing $$(pk_{data}^{sig}, sk_{data}^{sig})$$

of the data manager 340 may be used for mutual authentication when an authenticated key is exchanged between the data manger 330 and the machine learning core 350. The key pair for encryption ($pk_{data}$, $sk_{data}$) of the data manager 340 may be used when the key transport scheme is used for performing key exchange.

Operations 302 to 304 may be automatically performed before the user device 320 starts a federated learning service or after a federated learning-related application is installed. However, operations 302 to 304 are not limited thereto and may be performed by various methods.

In operation 305, when receiving a request for issuing a certificate from the central server 300, the intermediate server 310 may issue a certificate $$cert_{owner}^{proxy}$$

to the central server 300 using a key pair for signing $$(pk_{proxy}^{sig}, sk_{proxy}^{sig})$$

received from the root server 370. The certificate $$cert_{owner}^{proxy}$$

may include a key pair for signing $$(pk_{owner}^{sig}, sk_{owner}^{sig})$$

and a key pair for encryption ($pk_{owner}$, $sk_{owner}$) of the central server 300. For example, the intermediate server 310 may issue the certificate $$cert_{owner}^{proxy}$$

to each central server using the key pair for signing $$(pk_{proxy}^{sig}, sk_{proxy}^{sig}).$$

According to an embodiment, the key pair for signing $$(pk_{owner}^{sig}, sk_{owner}^{sig})$$

of the central server 300 may be used for mutual authentication when an authenticated key is exchanged between the central server 300 and the intermediate server 310. The key pair for encryption ($pk_{owner}$, $sk_{owner}$) of the central server 300 may be used when the key transport scheme is used for performing authenticated key exchange.

According to an embodiment, the central server 300 may be a plurality of agents. For example, the central server 300 may include a central server 1 300-1, a central server 2 300-2, and a central server 3 300-3. In this case, it is obvious to those skilled in the art that when there is a request for issuing a certificate from each central server, operation 305 may be directly applied to the issuance of a certificate for each central server. For example, the intermediate server 310 may issue a certificate $$cert_{owner1}^{proxy}$$

of the central server 1 300-1, and the certificate $$cert_{owner1}^{proxy}$$

may include a key pair for signing $$(pk_{owner1}^{sig}, sk_{owner1}^{sig})$$

and a key pair for encryption ($pk_{owner1}$, $sk_{owner1}$) of the central server 1 300-1.

Operation 305 may be performed by a request for issuing a certificate from the central server 300 when the central server 300 desires to perform federated learning using the user device 320. When the central server 300 is a plurality of agents, key pairs issued for each central server may all differ.

Hereinafter, a basic protocol for encryption and decryption of each piece of data (e.g., GM, local model, individual data, updated GM, etc.) is described.

Figure 4:
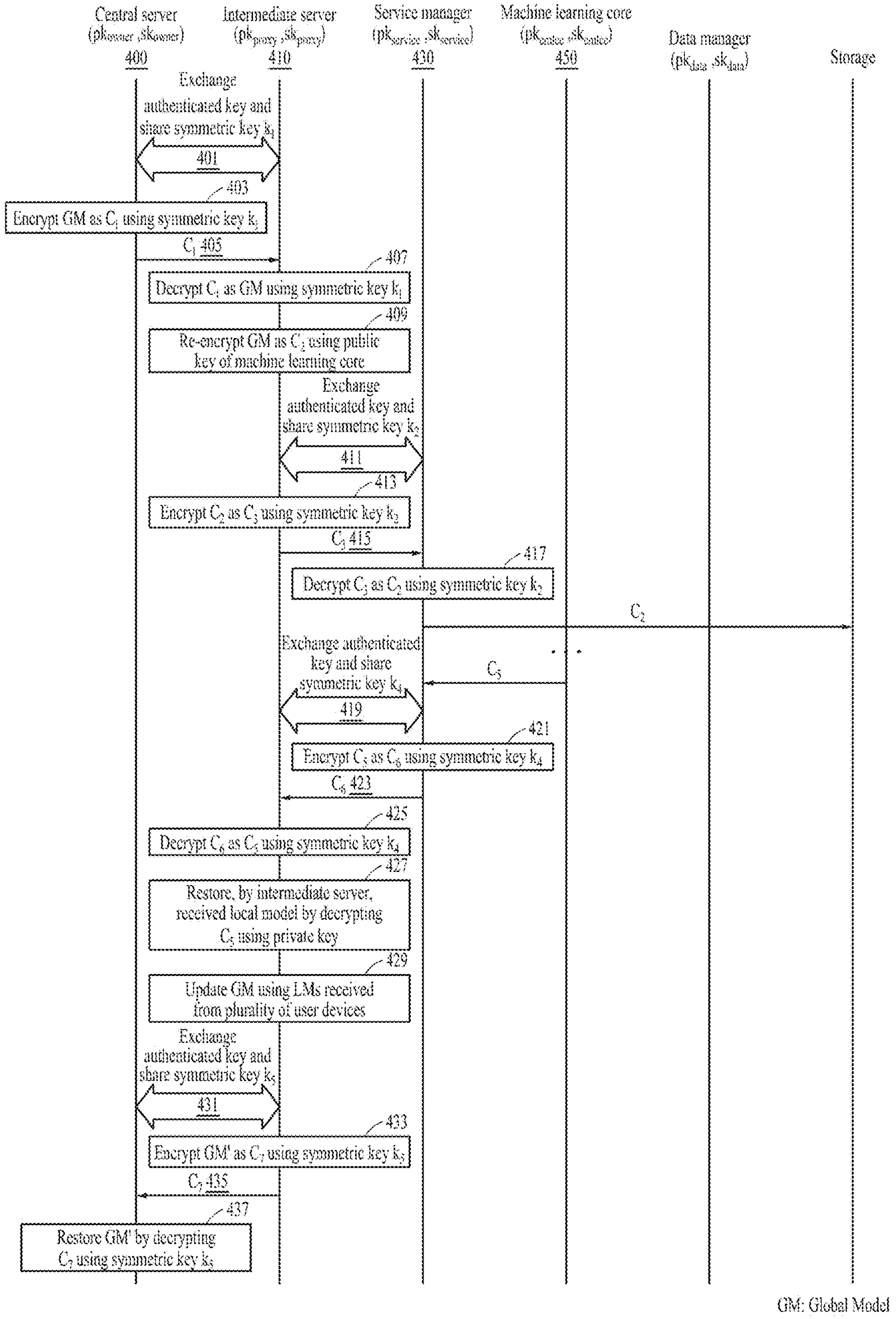
FIG. 4 is a flowchart illustrating a basic protocol of encryption and decryption, according to various embodiments.

FIG. 4 is a flowchart illustrating a basic protocol of encryption and decryption, according to various embodiments.

In operation 401, a central server 400 (e.g., the central server 200 of FIG. 2 and the central server 300 of FIG. 3) may perform authenticated key exchange to transmit a global model (hereinafter, "GM") to an intermediate server 410 (e.g., the server 108 of FIG. 1, the intermediate server 210 of FIG. 2, and the intermediate server 310 of FIG. 3). After performing key exchange, the central server 400 may share a symmetric key $k_1$ with the intermediate server 410. In the present disclosure, an authenticated key exchange protocol may be one of the standard protocols specified in protocols (e.g., protocols such as ISO/IEC 11770-3 and NIST SP 800-56A/B) that are proven secure by various standards.

In operation 403, the central server 400 may encrypt the GM using the symmetric key $k_1$. In FIG. 4, the GM encrypted by the symmetric key $k_1$ may be represented by $C_1$.

In operation 405, the central server 400 may transmit the encrypted $C_1$ to the intermediate server 410. Since the symmetric key $k_1$ is generated by the proven secure protocol, information about the GM may not be exposed, except to the intermediate server 410 sharing the symmetric key $k_1$. In other words, no information about the GM before encryption may be exposed to entities other than those participating in the aforementioned protocol.

In operation 407, the intermediate server 410 may decrypt $C_1$ using the symmetric key $k_1$. In other words, the GM may be restored.

In operation 409, the GM may be re-encrypted as $C_2$ using the public key of a machine learning core 450. According to an embodiment, when re-encrypting the GM, the intermediate server 410 may generate a predetermined key $k_r$, considering computational efficiency. The intermediate server 410 may encrypt the predetermined key $k_r$ using the public key and then encrypt the GM using symmetric key encryption (e.g., AES256-GCM) with the predetermined key $k_r$, thereby transmitting both ciphertexts.

In operation 411, the intermediate server 410 and a service manager 430 (e.g., the service manager 230 of FIG. 2 and the service manager 330 of FIG. 3) may exchange a symmetric key $k_2$, which is an authenticated key, to transmit $C_2$. The intermediate server 410 and the service manager 430 may share the symmetric key $k_2$ after exchanging the key.

In operation 413, the intermediate server 410 may encrypt $C_2$ as $C_3$ using the symmetric key $k_2$.

In operation 415, the intermediate server 410 may transmit $C_3$ to the service manager 430.

In operation 417, the service manager 430 may obtain $C_2$ by decrypting $C_3$ using the symmetric key $k_2$ shared with the intermediate server 410. The operations from when the service manager 430 transmits $C_2$ to another entity until the service manager 430 receives $C_5$ are described with reference to FIGS. 5 to 8. The operations from when the service manager 430 transmits $C_2$ to another entity until the service manager 430 receives $C_5$ may vary depending on the location of a key manager. $C_5$ may be an encrypted local model generated by a user device (e.g., the electronic device 101 of FIG. 1, the user device 220 of FIG. 2, and the user device 320 of FIG. 3). $C_5$ is described with reference to FIGS. 5 to 8.

In operation 419, the service manager 430 and the intermediate server 410 may exchange an authenticated key such that the service manager 430 may transmit the received $C_5$ to the intermediate server 410. The service manager 430 may share a symmetric key $k_4$ with the intermediate server 410 after performing authenticated key exchange.

In operation 421, the service manager 430 may encrypt $C_5$ as $C_6$ using the symmetric key $k_4$.

In operation 423, the service manager 430 may transmit $C_6$ to the intermediate server 410.

In operation 425, the intermediate server 410 may decrypt the received $C_6$ as $C_5$ using the symmetric key $k_4$.

In operation 427, the intermediate server 410 may restore a received local model (hereinafter, "LM") by decrypting $C_5$ using a private key.

In operation 429, the intermediate server 410 may generate GM' by updating a GM using LMs (e.g., the $LM_i$ of FIG. 2) received from a plurality of user devices. In the present disclosure, the intermediate server 410 may update the GM to generate the updated GM (hereinafter, "GM'"). The intermediate server 410 may generate the GM' using a plurality of LMs in an aggregator (e.g., the aggregator 213 of FIG. 2).

In operation 431, the intermediate server 410 may exchange an authenticated key with the central server 400 to transmit the GM' to the central server 400 and may share a symmetric key $k_5$ with the central server 400.

In operation 433, the intermediate server 410 may encrypt the GM' as $C_7$ using the symmetric key $k_5$ shared with the central server 400.

In operation 435, the intermediate server 410 may transmit $C_7$ to the central server 400.

In operation 437, the central server 400 may restore the GM' by decrypting the received $C_7$ using the symmetric key $k_5$.

In the present disclosure, since the intermediate server 410 transmits, to the central server 400, a GM (i.e., GM') updated using LMs received from respective user devices, no information other than the GM' may be transmitted to the central server 400. In addition, encryption is performed during the data transmitting process between each entity, and thus, no information related to federated learning may be provided to entities not participating in a protocol.

Hereinafter, an embodiment that varies depending on whether a key manager is included in the machine learning core 450 is described.

Figure 5:
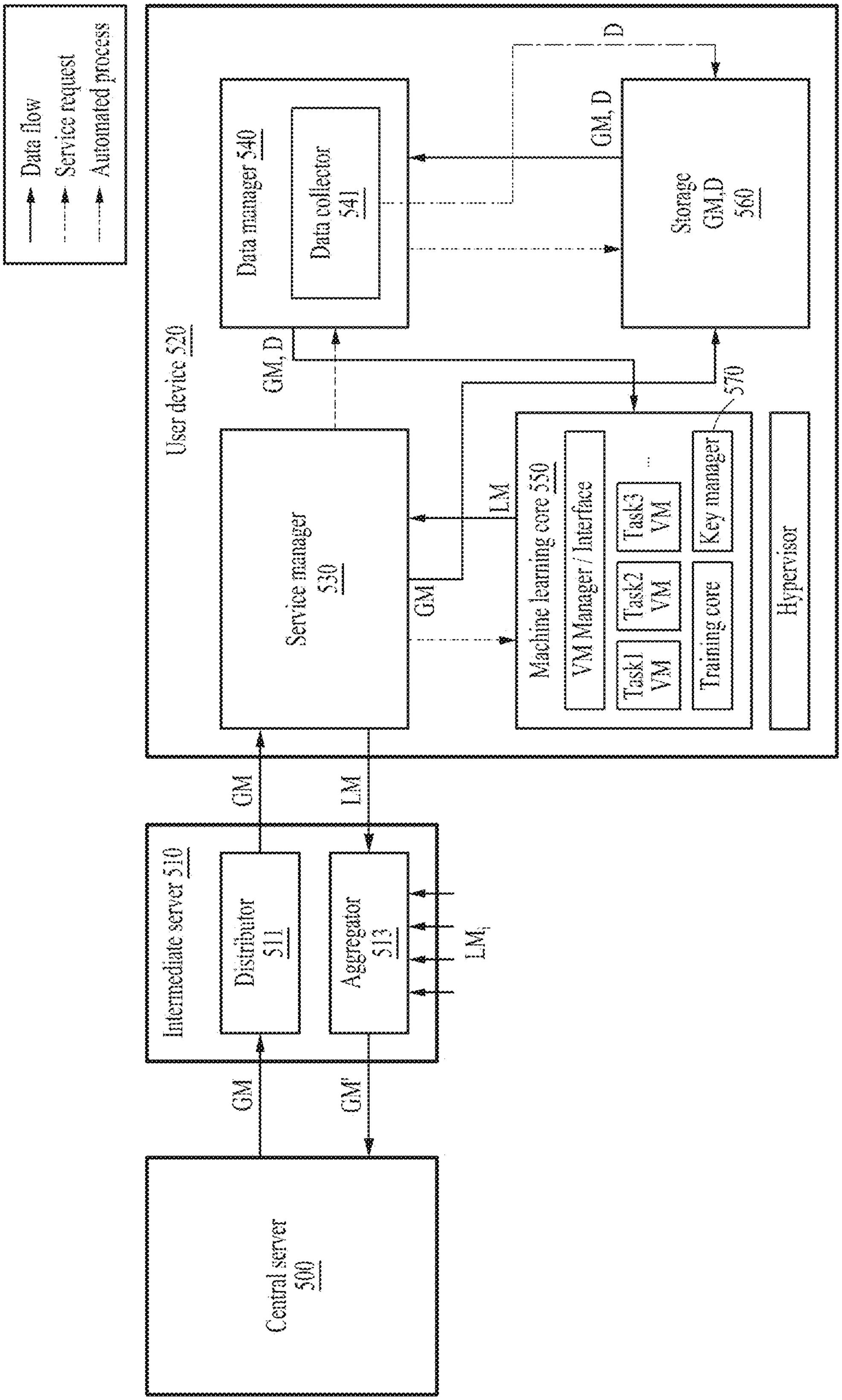
FIG. 5 is a diagram illustrating data flow of federated learning, according to various embodiments.

FIG. 5 is a diagram illustrating data flow of federated learning, according to various embodiments.

FIG. 5 illustrates a machine learning core 550 (e.g., the machine learning core 250 of FIG. 2, the machine learning core 350 of FIG. 3, and the machine learning core 450 of FIG. 4) including a key manager 570. According to an embodiment, the machine learning core 550 is in the form of a hypervisor-based virtual machine (hereinafter, "VM") and may perform federated learning in an independent environment (i.e., confidential computing environment).

In this case, learning instances (e.g., Task 1 VM, Task 2 VM, and Task 3 VM of FIG. 5) may be generated in the VM. The machine learning core 550 may provide a confidential computing environment. Therefore, during the learning process, a global model (hereinafter, "GM") and individual data of a user device 520 (e.g., the electronic device 101 of FIG. 1, the user device 220 of FIG. 2, and the user device 320 of FIG. 3) may be protected from other processes, malware, and the like.

According to an embodiment, a central server 500 (e.g., the central server 200 of FIG. 2, the central server 300 of FIG. 3, and the central server 400 of FIG. 4) may transmit the GM to an intermediate server 510 (e.g., the server 108 of FIG. 1, the intermediate server 210 of FIG. 2, the intermediate server 310 of FIG. 3, and the intermediate server 410 of FIG. 4). The intermediate server 510 may transmit the GM to the user device 520 using a distributor 511 (e.g., the distributor 211 of FIG. 2).

According to an embodiment, the user device 520 may store the received GM in a storage 560 (e.g., the storage 260 of FIG. 2) using a service manager 530 (e.g., the service manager 230 of FIG. 2, the service manager 330 of FIG. 3, and the service manager 430 of FIG. 4). When the service manager 530 requests data for training from a data manager 540 (e.g., the data manager 240 of FIG. 2 and the data manager 340 of FIG. 3), the data manager 540 may transmit the GM stored in the storage 560 and data (i.e., individual data) (hereinafter, "D") of the user device 520 to the machine learning core 550. The D may be individual data of the user device 520 collected from a data collector 541 (e.g., the data collector 241 of FIG. 2) of the data manager 540.

According to an embodiment, the machine learning core 550 may perform machine learning using the received GM and D. The machine learning core 550 may generate a local model (hereinafter, "LM") by performing machine learning. The machine learning core 550 may transmit the LM to the service manager 530.

According to an embodiment, the service manager 530 may transmit the LM to the intermediate server 510. An aggregator 513 (e.g., the aggregator 213 of FIG. 2) of the intermediate server 510 may update the GM using LMs (i.e., $LM_i$ of FIG. 5, wherein i denotes the number of user devices) received from respective user devices to generate a GM'. The intermediate server 510 may transmit the GM' to the central server 500.

According to an embodiment, a key manager 570 may be included in the machine learning core 550. The key manager 570 may safely store and manage keys necessary to protect data transmitted to the machine learning core 550.

Hereinafter, encryption and decryption performed between the service manager 530, the data manager 540, the machine learning core 550, and the storage 560 are described with reference to FIG. 5.

Figure 6:
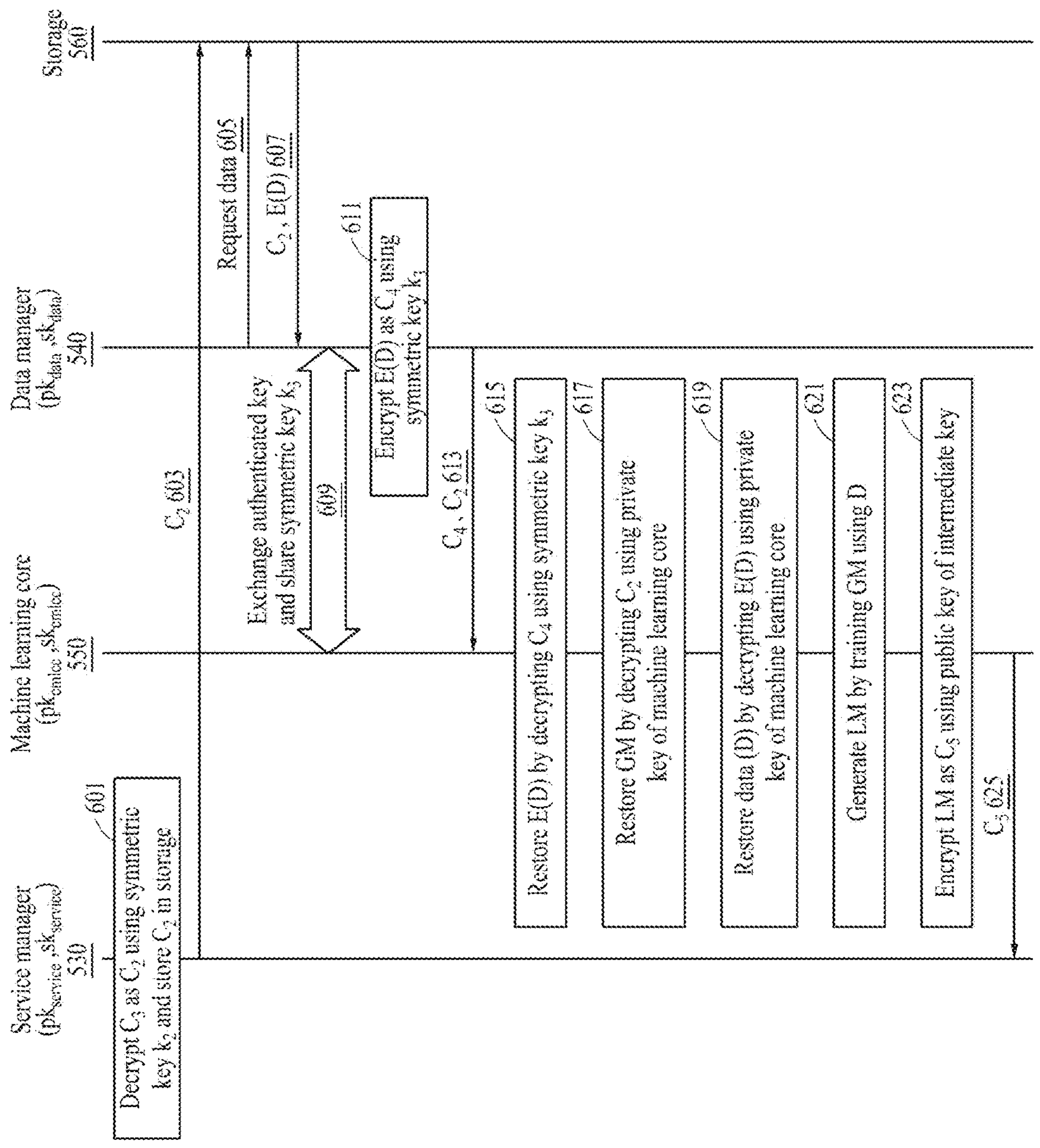
FIG. 6 is a flowchart illustrating a protocol of encryption and decryption, according to various embodiments.

FIG. 6 is a flowchart illustrating a protocol of encryption and decryption, according to various embodiments.

Hereinafter, the process from storing $C_2$ to generating $C_5$, which is omitted from FIG. 4, is described. Operation 601 may correspond to operation 417 of FIG. 4.

In operation 601, the service manager 530 (e.g., the service manager 230 of FIG. 2, the service manager 330 of FIG. 3, and the service manager 430 of FIG. 4) may store, in the storage 560, $C_2$ obtained by decrypting $C_3$ using a symmetric key $k_2$ shared with the intermediate server 410.

The data manager 540 (e.g., the data manager 240 of FIG. 2 and the data manager 340 of FIG. 3) may receive a request for training data from the service manager 530.

In operation 605, the data manager 540 may request data from the storage 560 in response to a data request.

In operation 607, the data manager 540 may receive $C_2$ and encrypted individual data (hereinafter, "E(D)") of a user device. In other words, the data manager 540 may receive encrypted pieces of data. E(D) may be the individual data of the user device collected by a data collector (e.g., the data collector 241 of FIG. 2 and the data collector 541 of FIG. 5), encrypted with a public key $pk_{cmlcc}$ of the machine learning core 550 (e.g., the machine learning core 250 of FIG. 2, the machine learning core 350 of FIG. 3, and the machine learning core 450 of FIG. 4). Therefore, an unauthorized entity may not access E(D). According to an embodiment, instead of directly encrypting data with the public key $pk_{cmlcc}$ of the machine learning core 550, a predetermined key $k_r$ considering computational efficiency may be used. The predetermined key $k_r$ may be encrypted using the public key $pk_{cmlcc}$ of the machine learning core 550, individual data may be encrypted using symmetric key encryption, such as AES256-GCM, with the predetermined key $k_r$, and then two ciphertexts may be stored and transmitted.

In operation 609, the machine learning core 550 may exchange an authenticated key with the data manager 540 to receive E(D) from the data manager 540 and may share a symmetric key $k_3$ with the data manager 540.

In operation 611, the data manager 540 may encrypt E(D) as $C_4$ using the symmetric key $k_3$.

In operation 613, the data manager 540 may transmit $C_4$ and $C_2$ to the machine learning core 550.

In operation 615, the machine learning core 550 may decrypt the received $C_4$ using the symmetric key $k_3$ to restore E(D).

In operation 617, the machine learning core 550 may restore a global model (hereinafter, "GM") by decrypting $C_2$ using a private key ($sk_{cmlcc}$).

In operation 619, the machine learning core 550 may restore individual data (hereinafter, "D") by decrypting E(D) using the private key of the machine learning core 550.

In operation 621, the machine learning core 550 may generate a local model (hereinafter, "LM") by performing machine learning using the GM and the D. The machine learning core may be a region (e.g., a hypervisor-based VM) isolated from an external process. Therefore, it may be possible to prevent the exposure of plaintext data information that may occur during a machine learning process.

In operation 623, the machine learning core 550 may encrypt the LM as $C_5$ using the public key ($pk_{proxy}$) of the intermediate server 510. According to an embodiment, a predetermined key $k_r$ may be used considering computational efficiency instead of directly encrypting the LM using the public key ($pk_{proxy}$) of the intermediate server 510. The predetermined key $k_r$ may be encrypted using the public key ($pk_{proxy}$) of the intermediate server 510, the LM may be encrypted using symmetric key encryption, such as AES256-GCM, with the predetermined key $k_r$, and then two ciphertexts may be transmitted.

In operation 625, the machine learning core 550 may transmit $C_5$ to the service manager 530. After operation 625, operations 419 to 437 of FIG. 4 may be performed, so description thereof is omitted.

Hereinafter, unlike in FIGS. 5 and 6, a case in which a key manager is located outside the machine learning core according to various embodiments, is described.

Figure 7:
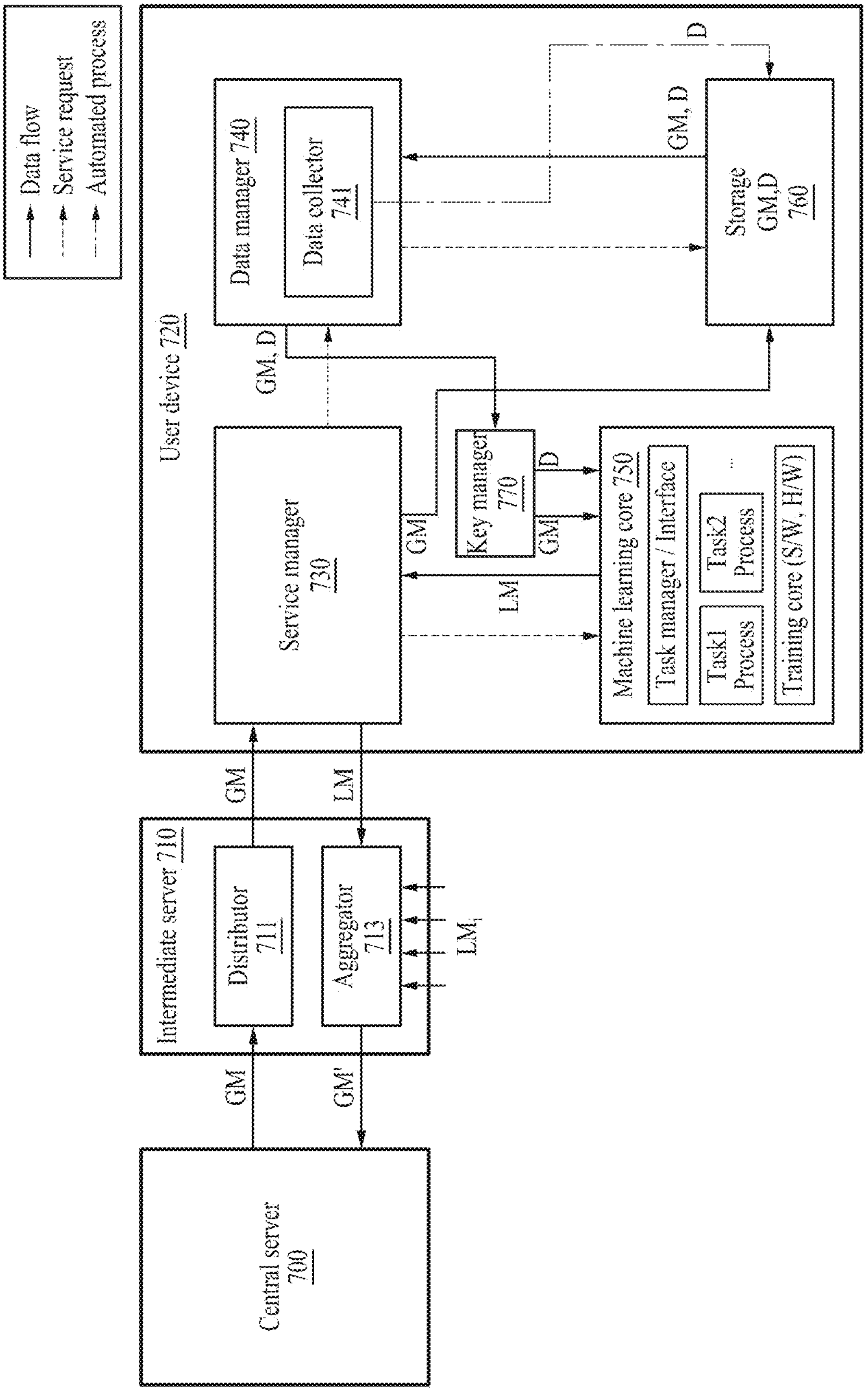
FIG. 7 is a diagram illustrating data flow of federated learning, according to various embodiments.

FIG. 7 is a diagram illustrating data flow of federated learning, according to various embodiments.

Referring to FIG. 7, a key manager 770 (e.g., the key manager 570 of FIG. 5) may be located outside a machine learning core 750 (e.g., the machine learning core 250 of FIG. 2, the machine learning core 350 of FIG. 3, the machine learning core 450 of FIG. 4, and the machine learning core 550). According to an embodiment, the machine learning core 750 may be implemented in software. In this case, the key manager 770 may exist outside the machine learning core 750 to protect a minimum global model (hereinafter, "GM"), and a safe environment such as a TEE may be required. In other words, a user device 720 (e.g., the electronic device 101 of FIG. 1, the user device 220 of FIG. 2, the user device 320 of FIG. 3, and the user device 520 of FIG. 5) may encrypt the received GM using a key stored in a key manager and store the encrypted GM in a storage 760 (e.g., the storage 260 of FIG. 2 and the storage 560 of FIG. 5). The encrypted GM may be transmitted to the machine learning core 750 through a data manager 740 (e.g., the data manager 240 of FIG. 2, the data manager 340 of FIG. 3, and the data manager 540 of FIG. 5) at the time of performing machine learning, and the key manager 770 may be used for decryption.

A central server 700 (e.g., the central server 200 of FIG. 2, the central server 300 of FIG. 3, the central server 400, and the central server 500) may transmit a GM to an intermediate server 710 (e.g., the server 108 of FIG. 1, the intermediate server 210 of FIG. 2, the intermediate server 310 of FIG. 3, the intermediate server 410 of FIG. 4, and the intermediate server 510 of FIG. 5). The intermediate server 710 may transmit the GM to the user device 720 using a distributor 711 (e.g., the distributor 211 of FIG. 2 and the distributor 511 of FIG. 5).

According to an embodiment, the user device 720 may store the received GM in the storage 760 (e.g., the storage 260 of FIG. 2) using a service manager 730 (e.g., the service manager 230 of FIG. 2, the service manager 330 of FIG. 3, the service manager 430 of FIG. 4, and the service manager 530 of FIG. 5). When the service manager 730 transmits a request for training data to the data manager 740, the data manager 740 may transmit the GM stored in the storage 760 and data (i.e., individual data) (hereinafter, "D") of the user device 720 to the key manager 770. The D may be individual data of the user device 720 collected by a data collector 741 (e.g., the data collector 241 of FIG. 2 and the data collector 541 of FIG. 5) of the data manager 740.

The key manager 770 may transmit the received GM and D to the machine learning core 750. The machine learning core 750 may perform machine learning using the received GM and D. The machine learning core 750 may generate a local model (hereinafter, "LM") by performing machine learning. The machine learning core 750 may transmit the LM to the service manager 730.

The service manager 730 may transmit the LM to the intermediate server 710. An aggregator 713 (e.g., the aggregator 213 of FIG. 2 and the aggregator 513 of FIG. 5) of the intermediate server 710 may update the GM using LMs (i.e., $LM_i$ of FIG. 7, wherein i denotes the number of user devices) received from respective user devices to generate a GM'. The intermediate server 510 may transmit the GM' to the central server 500.

Hereinafter, encryption and decryption performed between the service manager 730, the data manager 740, the machine learning core 750, and the storage 760 are described.

Figure 8:
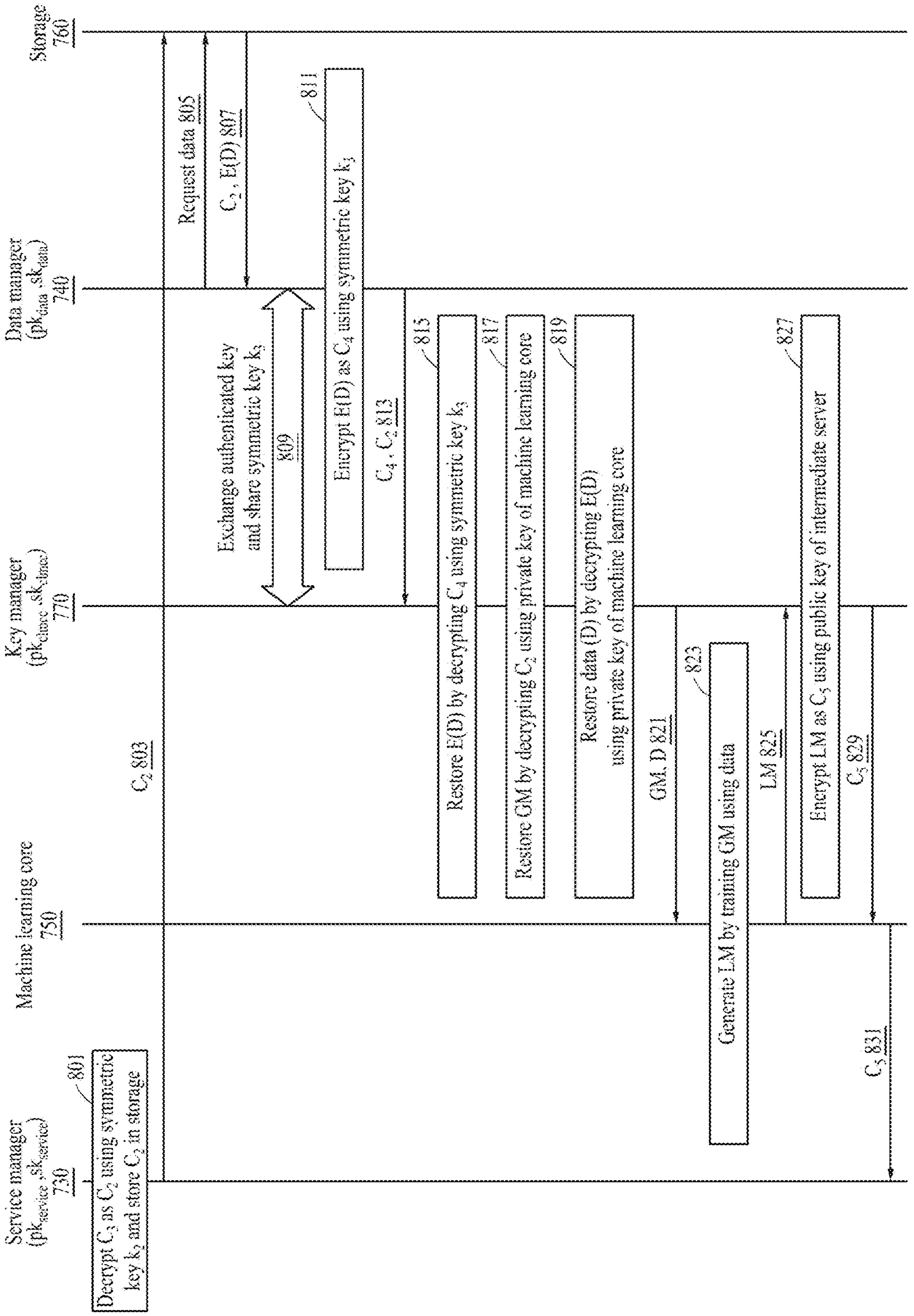
FIG. 8 is a flowchart illustrating a protocol of encryption and decryption, according to various embodiments.

FIG. 8 is a flowchart illustrating a protocol of encryption and decryption, according to various embodiments.

When the key manager 770 (e.g., the key manager 570 of FIG. 5) is located outside the machine learning core 750 (e.g., the machine learning core 250 of FIG. 2, the machine learning core 350 of FIG. 3, the machine learning core 450 of FIG. 4, and the machine learning core 550), the certificate $$cert_{cmlcc}^{root}$$

issued to the machine learning core 350 of FIG. 3 may be managed by the key manager 770.

Operations 801 to 807 correspond to operations 601 to 607 of FIG. 6, so the descriptions of operations 801 to 807 are omitted.

In operation 809, the key manager 770 may exchange an authenticated key with the data manager 740 (e.g., the data manager 240 of FIG. 2, the data manager 340 of FIG. 3, and the data manager 540 of FIG. 5) to receive encrypted individual data E(D) of a user device (e.g., the electronic device 101 of FIG. 1, the user device 220 of FIG. 2, the user device 320 of FIG. 3, the user device 520 of FIG. 5, and the user device 720) and may share a symmetric key $k_3$ with the data manager 740. Even when individual data is stored in the storage 760 (e.g., the storage 260 of FIG. 2 and the storage 560 of FIG. 5), the individual data may be encrypted using the public key (i.e., public key $pk_{cmlcc}$) of an entity (i.e., the machine learning core 750) that has access to the individual data. Therefore, an entity without access authority may not access individual data. According to an embodiment, a predetermined key $k_r$ may be used considering computational efficiency in addition to encrypting the individual data using the public key $pk_{cmlcc}$ of the machine learning core 750. The predetermined key $k_r$ may be encrypted using the public key $pk_{cmlcc}$ of the machine learning core 750, the individual data may be encrypted using symmetric encryption, such as AES256-GCM, with the predetermined key, and then two ciphertexts may be stored and transmitted.

In operation 811, the data manager 740 may encrypt E(D) as $C_4$ using a symmetric key $k_3$.

In operation 813, the data manager 740 may transmit $C_4$ and $C_2$ to the key manager 770.

In operation 815, the key manager 770 may restore E(D) by decrypting $C_4$ using the symmetric key $k_3$.

In operation 817, the key manager 770 may restore a global model (hereinafter, "GM") by decrypting $C_2$ using the private key $sk_{cmlcc}$ of the machine learning core 750.

In operation 819, the key manager 770 may restore individual data (hereinafter, "D") by decrypting E(D) using the private key $sk_{cmlcc}$ of the machine learning core 750.

In operation 821, the key manager 770 may transmit the GM and the D to the machine learning core 750.

In operation 823, the machine learning core 750 may generate a local model (hereinafter, "LM") by performing machine learning using the GM and the D. The machine learning core 750 is an area disconnected from external communication, so plaintext data information that may be generated during the machine learning process may not be exposed.

In operation 825, the machine learning core 750 may transmit the LM to the key manager 770 to encrypt the LM.

In operation 827, the key manager 770 may encrypt the LM as $C_5$ using the public key of an intermediate server (e.g., the server 108 of FIG. 1, the intermediate server 210 of FIG. 2, the intermediate server 310 of FIG. 3, the intermediate server 410 of FIG. 4, the intermediate server 510 of FIG. 5, and the intermediate server 710). According to an embodiment, a predetermined key $k_r$ may be used considering computational efficiency instead of encrypting the LM using the public key of the intermediate server. The predetermined key $k_r$ may be encrypted using the public key of the intermediate server, the LM may be encrypted using symmetric key encryption, such as AES256-GCM, with the predetermined key $k_r$, and then two ciphertexts may be transmitted.

In operation 829, the key manager 770 may transmit $C_5$ to the machine learning core 750.

In operation 831, the machine learning core 750 may transmit $C_5$ to the service manager 730.

Figure 9:
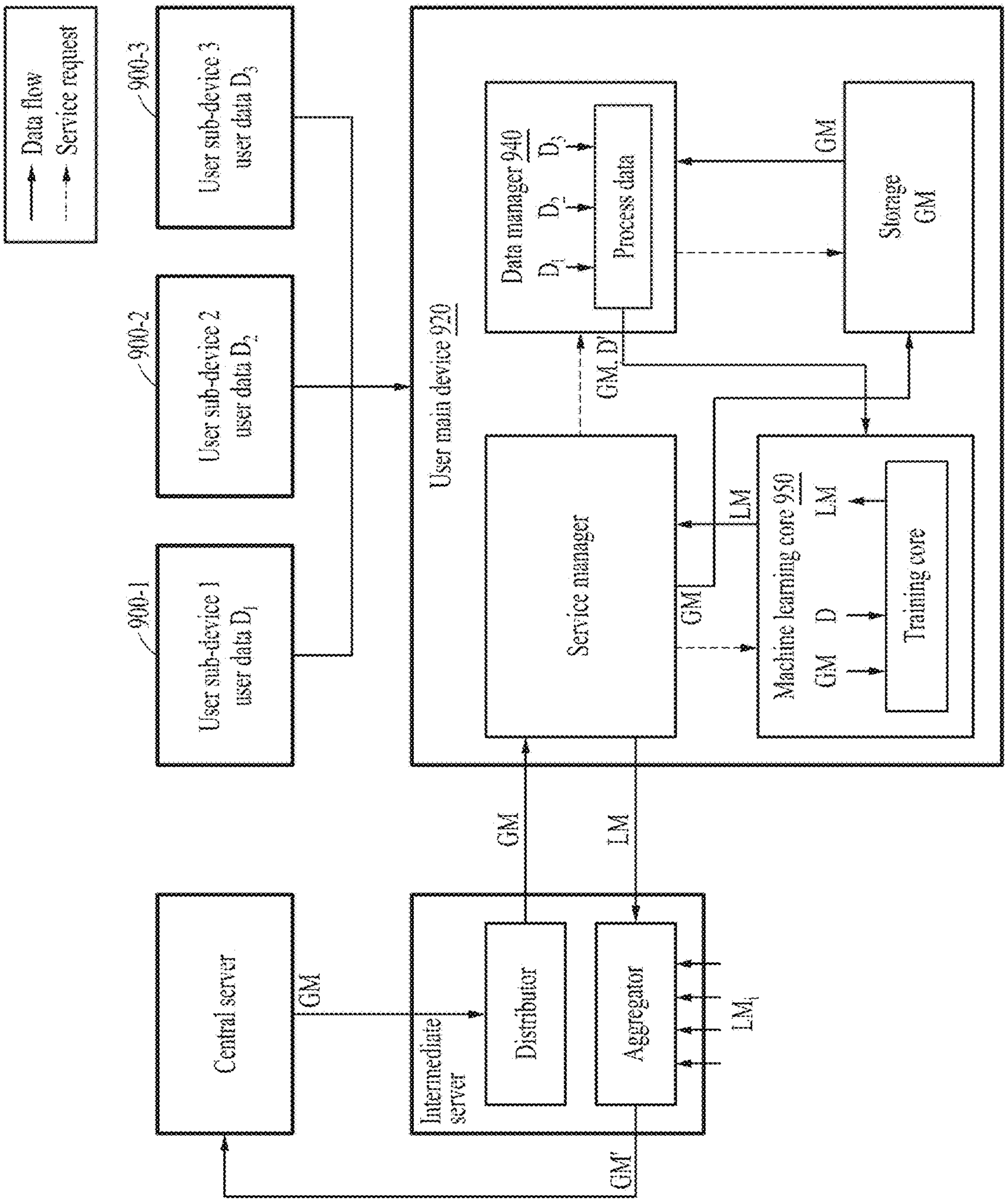
FIG. 9 is a diagram illustrating data flow of trusted learning, according to various embodiments.

FIG. 9 is a diagram illustrating data flow of trusted learning, according to various embodiments.

FIG. 9 illustrates a plurality of user sub-devices. A plurality of user sub-devices 900 may be terminals that may not perform machine learning. For example, the plurality of user sub-devices 900 may be devices, such as wearable devices, that may not have resources enough to perform machine learning but may collect data.

In this case, pieces of data (e.g., $D_1$, $D_2$, and $D_3$) collected by the plurality of sub-devices 900 may be transmitted to a user main device 920 (e.g., the electronic device 101 of FIG. 1, the user device 220 of FIG. 2, the user device 320 of FIG. 3, the user device 520 of FIG. 5, and the user device 720 of FIG. 7). In addition, the user main device 920 may train a global model (hereinafter, "GM") using the pieces of data (e.g., $D_1$, $D_2$, and $D_3$) received from the plurality of sub-devices 900. According to an embodiment, the pieces of data received through the plurality of user sub-devices 900 may be preprocessed by a data manager 940 (e.g., the data manager 240 of FIG. 2, the data manager 340 of FIG. 3, the data manager 540 of FIG. 5, and the data manager 740 of FIG. 7). The preprocessed pieces of data may be transmitted to a machine learning core 950 (e.g., the machine learning core 250 of FIG. 2, the machine learning core 350 of FIG. 3, the machine learning core 450 of FIG. 4, the machine learning core 550 of FIG. 5, and the machine learning core 750 of FIG. 7) and used for training.

In other words, the user main device 920 may not perform separate machine learning using data collected by the user main device 920 but may only perform trusted training using the pieces of data (e.g., $D_1$, $D_2$, and $D_3$) received from the plurality of sub-devices 900. According to an embodiment, trusted training may be performed by the machine learning core 950. According to an embodiment, trusted training may be performed by a training core included in the machine learning core 950.

In the trusted learning scenario described above, it is evident to those skilled in the art that the descriptions provided with reference to FIGS. 2 to 8 may be applied directly, except for the fact that data used to train a GM is collected not by the user main device 920 but by the plurality of user sub-devices 900. Therefore, the description of federated learning using data collected by the plurality of user sub-devices 900 is omitted.

According to an embodiment, an intermediate server (e.g., the server 108 of FIG. 1, the intermediate server 210 of FIG. 2, the intermediate server 310 of FIG. 3, the intermediate server 410 of FIG. 4, the intermediate server 510 of FIG. 5, and the intermediate server 710) may include a memory, comprising one or more storage mediums, storing instructions and at least one processor comprising processing circuitry, wherein the instructions, when executed by the at least one processor individually and/or collectively, cause the intermediate server to receive a global model from a central server (e.g., the central server 200 of FIG. 2, the central server 300 of FIG. 3, the central server 400 of FIG. 4, the central server 500 of FIG. 5, and the central server 700 of FIG. 7) and transmit the global model to a plurality of user devices included in a system. The instructions, when executed by the at least one processor individually and/or collectively, cause the intermediate server to update the global model based on a plurality of local models received respectively from the plurality of user devices in response to the transmission of the global model. One or more of the plurality of user devices may include a machine learning core (e.g., the machine learning core 250 of FIG. 2, the machine learning core 350 of FIG. 3, the machine learning core 450 of FIG. 4, the machine learning core 550 of FIG. 5, the machine learning core 750 of FIG. 7, and the machine learning core 950) configured to train the global model and generate a local model. The global model and individual data of a user device (e.g., the electronic device 101 of FIG. 1, the user device 220 of FIG. 2, the user device 320 of FIG. 3, the user device 520 of FIG. 5, the user device 720 of FIG. 7, and the user main device 920 of FIG. 9) input into a machine learning core may be encrypted or decrypted based on whether a key manager (e.g., the key manager 570 of FIG. 5 and the key manager 770 of FIG. 7) is included in the machine learning core.

According to an embodiment, the intermediate server may receive a first certificate including a first key pair for signing and a first key pair for encryption from a root server (e.g., the root server 370 of FIG. 3). The intermediate server may issue a certificate to the central server based on the first key pair for signing in response to a certificate issuance request from the central server.

According to an embodiment, the intermediate server may share, with the central server, a first symmetric key for transmitting the global model. The intermediate server may share, with the central server, a fifth symmetric key for transmitting the updated global model.

According to an embodiment, the intermediate server may encrypt the global model using a public key of the machine learning core. The intermediate server may re-encrypt the encrypted global model using a second symmetric key shared with a service manager. The intermediate serve may transmit the re-encrypted global model to the machine learning core through the service manager.

According to an embodiment, the intermediate server may share the second symmetric key for transmitting the global model with the service manager (e.g., the service manager 230 of FIG. 2, the service manager 330 of FIG. 3, the service manager 430 of FIG. 4, the service manager 530 of FIG. 5, and the service manager 730 of FIG. 7) of the user device. The intermediate server may share, with the service manager, a fourth symmetric key for transmitting the local model.

According to an embodiment, the user device may include a memory, comprising one or more storage mediums, storing instructions and at least one processor comprising processing circuitry, wherein the instructions, when executed by the at least one processor individually and/or collectively, cause the user device to receive the global model from the intermediate server. The instructions, when executed by the at least one processor individually and/or collectively, cause the user device to generate the local model by training the global model in the machine learning core using the individual data of the user device. The instructions, when executed by the at least one processor individually and/or collectively, cause the user device to transmit the generated local model to the intermediate server.

According to an embodiment, the global model and the individual data input into the machine learning core may be encrypted or decrypted based on whether the key manager is included in the machine learning core.

According to an embodiment, the user device may include the machine learning core configured to train the global model. The user device may include a service manager configured to communicate with the intermediate server. The user device may include a data manager (e.g., the data manager 240 of FIG. 2, the data manager 340 of FIG. 3, the data manager 540 of FIG. 5, the data manager 740 of FIG. 7, and the data manager 940 of FIG. 9) configured to collect individual data and store the individual data in a memory.

According to an embodiment, the machine learning core may receive a second key pair for signing and a second key pair for encryption. The machine learning core may issue a certificate to the service manager based on the second key pair for signing in response to the certificate issuance request from the service manager.

According to an embodiment, when the key manager is included in the machine learning core, the individual data input into the machine learning core may be encrypted by a third symmetric key shared between the machine learning core and the data manager.

According to an embodiment, when the key manager is not included in the machine learning core, the individual data input into the machine learning core may be decrypted by the third symmetric key shared between the key manager and the data manager.

According to an embodiment, the machine learning core may transmit the local model to the key manager. The key manager may encrypt the local model using the public key of the key manager and transmit the local model back to the machine learning core.

According to an embodiment, a system may include an intermediate server having a memory, comprising one or more storage mediums, storing instructions and at least one processor comprising processing circuitry, wherein the instructions, when executed by the at least one processor individually and/or collectively, cause the intermediate server to perform operations. The intermediate server may receive a global model from a central server and transmit the global model to a plurality of user devices included in the system. The intermediate server may update the global model based on a plurality of local models received respectively from the plurality of user devices in response to the transmission of the global model. The system may include the plurality of user devices. The plurality of user devices may receive the global model. The plurality of user devices may generate a local model by training the global model using individual data. The plurality of user devices may include a plurality of user devices configured to transmit the generated local model to the intermediate server. One or more of the plurality of user devices may include a machine learning core configured to generate a local model by training the global model. The global model and the individual data input into the machine learning core may be encrypted or decrypted based on whether a key manager is included in the machine learning core.

According to an embodiment, one or more of the plurality of user devices may include the machine learning core configured to train the global model. One or more of the plurality of user devices may include a service manager configured to communicate with the intermediate server. One or more of the plurality of user devices may include a data manager configured to collect individual data and store the individual data in a memory.

According to an embodiment, the global model received from the intermediate server may be encrypted based on a public key of the machine learning core. The individual data may be encrypted based on the public key of the machine learning core and stored in a storage (e.g., the storage 260 of FIG. 2, the storage 560 of FIG. 5, and the storage 760 of FIG. 7) of the user device. The individual data stored in the storage may be decrypted using the public key of the machine learning core when the global model is trained.

According to an embodiment, the intermediate server may receive a first certificate including a first key pair for signing and a first key pair for encryption from a root server. The intermediate server may issue a certificate to the central server based on the first key pair for signing in response to a certificate issuance request from the central server.

According to an embodiment, the machine learning core may receive a second key pair for signing and a second key pair for encryption. The machine learning core may issue a certificate to the service manager based on the second key pair for signing in response to the certificate issuance request from the service manager.

According to an embodiment, the machine learning core may receive a second key pair for signing and a second key pair for encryption. The machine learning core may receive a certificate to the data manger based on the second key pair for signing in response to the certificate issuance request from the data manager.

According to an embodiment, the intermediate server may share, with the central server, a first symmetric key for transmitting the global model. The intermediate server may share, with the central server, a fifth symmetric key for transmitting the updated global model.

According to an embodiment, the intermediate server may share, with the service manager, the second symmetric key for transmitting the global model. The intermediate server may share, with the service manager, a fourth symmetric key for transmitting the local model.

According to an embodiment, when the key manager is included in the machine learning core, the individual data input into the machine learning core may be encrypted by a third symmetric key shared between the machine learning core and the data manager.

According to an embodiment, when the key manager is not included in the machine learning core, the individual data input into the machine learning core may be decrypted by the third symmetric key shared between the key manager and the data manager.

According to an embodiment, the machine learning core may transmit the local model to the key manager. The key manager may encrypt the local model using the public key of the key manager and transmit the local model back to the machine learning core.

The embodiments of the present disclosure disclosed in the specification and the drawings are merely presented to easily describe the technical contents of various embodiments of the present disclosure and help the understanding of them and are not intended to limit the various embodiments. Therefore, all changes or modifications derived from the technical idea of the embodiments of the present disclosure as well as the embodiments disclosed herein should be construed to fall within the embodiments.

What is claimed is:

1. An intermediate server comprising:

memory, comprising one or more storage mediums, storing instructions; and at least one processor comprising processing circuitry, wherein the instructions, when executed by the at least one processor individually and/or collectively, cause the intermediate server to receive a global model from a central server to transmit the global model to a plurality of user devices comprised in a system and update the global model based on a plurality of local models received respectively from the plurality of user devices in response to the transmission of the global model, wherein one or more of the plurality of user devices comprise a machine learning core configured to generate a local model by training the global model, wherein the global model and individual data of a user device input into the machine learning core are encrypted or decrypted based on whether a key manager is comprised in the machine learning core, and wherein the intermediate server receives a first certificate comprising a first key pair for signing and a first key pair for encryption from a root server and issues a certificate to the central server based on the first key pair for signing in response to a certificate issuance request from the central server.

2. The intermediate server of claim 1, wherein the intermediate server is configured to share, with the central server, a first symmetric key for transmitting the global model and share, with the central server, a fifth symmetric key for transmitting the updated global model.

3. The intermediate server of claim 1, wherein the intermediate server is configured to encrypt the global model using a public key of the machine learning core, re-encrypt the encrypted global model using a second symmetric key shared with a service manager, and transmit the re-encrypted global model to the machine learning core through the service manager.

4. A user device comprising:

memory, comprising one or more storage mediums, storing instructions; and at least one processor comprising processing circuitry, wherein the instructions, when executed by the at least one processor individually and/or collectively, cause the user device to receive a global model from an intermediate server, generate a local model by training the global model using individual data of the user device in a machine learning core-configured to provide a computer environment independent of other components of the user device, and transmit the generated local model to the intermediate server, wherein the global model and the individual data input into the machine learning core are encrypted or decrypted based on whether a key manager is comprised in the machine learning core, wherein the machine learning core is logically or physically independent of the other components, and wherein the machine learning core is configured to receive a second key pair for signing and a second key pair for encryption from a root server and issue a certificate to a service manager based on the second key pair for signing in response to a certificate issuance request from the service manager.

5. The user device of claim 4, wherein the global model received from the intermediate server is encrypted based on a public key of the machine learning core, and the individual data is stored in a storage of the user device by being encrypted based on the public key of the machine learning core and decrypted using the public key of the machine learning core when the global model is trained.

6. The user device of claim 4, wherein, when the key manager is comprised in the machine learning core, the individual data input into the machine learning core is encrypted by a third symmetric key shared between the machine learning core and a data manager.

7. The user device of claim 4, wherein, when the key manager is not comprised in the machine learning core, the individual data input into the machine learning core is decrypted by a third symmetric key shared between the key manager and the data manager.

8. The user device of claim 4, wherein the machine learning core is configured to transmit the local model to the key manager, and the key manager is configured to encrypt the local model using a public key of the key manager and transmit the local model back to the machine learning core.

9. A system comprising:

an intermediate server comprising:

memory, comprising one or more storage mediums, storing instructions; and at least one processor comprising processing circuitry, wherein the instructions, when executed by the at least one processor individually and/or collectively, cause the intermediate server to receive a global model from a central server to transmit the global model to a plurality of user devices comprised in the system and update the global model based on a plurality of local models received respectively from the plurality of user devices in response to the transmission of the global model; and the plurality of user devices configured to receive the global model, generate a local model by training the global model using individual data, and transmit the generated local model to the intermediate server, wherein one or more of the plurality of user devices comprise a machine learning core configured to generate the local model by training the global model, wherein the global model and the individual data input into the machine learning core are encrypted or decrypted based on whether a key manager is comprised in the machine learning core, and wherein the intermediate server is configured to receive a first certificate comprising a first key pair for signing and a first key pair for encryption from a root server and issue a certificate to the central server based on the first key pair for signing in response to a certificate issuance request from the central server.

10. The system of claim 9, wherein one or more of the plurality of user devices comprise the machine learning core configured to train the global model, a service manager configured to communicate with the intermediate server, and a data manager configured to collect the individual data and store the individual data in a memory.

11. The system of claim 9, wherein the machine learning core is configured to receive a second key pair for signing and a second key pair for encryption from the root server and issue a certificate to the service manager based on the second key pair for signing in response to a certificate issuance request from the service manager.

12. The system of claim 9, wherein the machine learning core is configured to receive a second key pair for signing and a second key pair for encryption from the root server and issue a certificate to the data manager based on the second key pair for signing in response to a certificate issuance request from the data manager.

13. The system of claim 9, wherein the intermediate server is configured to share, with the central server, a first symmetric key for transmitting the global model and share, with the central server, a fifth symmetric key for transmitting the updated global model.

14. The system of claim 9, wherein the intermediate server is configured to share, with the service manager, a second symmetric key for transmitting the global model and share, with the service manager, a fourth symmetric key for transmitting the local model.

15. The system of claim 9, wherein, when the key manager is comprised in the machine learning core, the individual data input into the machine learning core is encrypted by a third symmetric key shared between the machine learning core and the data manager.

16. The system of claim 9, wherein, when the key manager is not comprised in the machine learning core, the individual data input into the machine learning core is decrypted by a third symmetric key shared between the key manager and the data manager.

17. The system of claim 9, wherein the machine learning core is configured to transmit the local model to the key manager, and the key manager is configured to encrypt the local model using a public key of the key manager and transmit the local model back to the machine learning core.

* * * * *